Patented Sept. 12, 1950

2,521,913

UNITED STATES PATENT OFFICE 2,521,913

PROCESS FOR ACYLATING ENOLIZABLE ORGANIC COMPOUNDS

Hugh J. Hagemeyer, Jr., Kingsport, Tenn., assignor to Eastman Kodak Company, Rochester, N. Y., a corporation of New Jersey No Drawing. Application May 6, 1948,
Serial No. 25,525

7 Claims. (Cl. 260—484)

This invention relates to a process for acylating enolizable organic compounds.

It is known that ketene ($CH_2=C=O$) and substituted ketenes will react with certain aldehydes and ketones, in the presence of an acid catalyst, to give unsaturated carboxylic esters. For example, ketene can be reacted with ketones, in the presence of hydrochloric, phosphoric or sulfuric acids, to give isoalkenyl acetates of the type represented by isopropenyl acetate. See U. S. Patent 2,383,965 to Gwynn and Degering, dated September 4, 1945. Likewise, it is known that ketene can be reacted with ketoesters and diketones, in the presence of an acid catalyst containing the group —$SO_2OH$ (e. g. sulfuric acid, a halogenosulfonic acid such as chlorosulfonic acid, an alkylsulfuric acid such as methylsulfuric acid or a sulfamic acid such as sulfaminic acid) to produce enol acetates of these compounds, of which ethylacetoacetate and acetylacetone are typical. See U. S. Patents 2,407,301 and 2,407,302 to Spence and Degering, dated September 10, 1946. Unsaturated carboxylic esters have also been prepared by reacting ketene with aldehydes and ketones in the presence of still other acid catalysts such as p-toluene-sulfonic acid, sulfoacetic acid (HO—$SO_2$—$CH_2COOH$) or addition compounds formed in situ such as the sulfoacetic acid-acid addition product ($CH_3COOH.HO$—$SO_2$—$CH_2COOH$)

While the above-mentioned processes are capable of providing various useful unsaturated carboxylic esters, considerable polymerization occurs in the reactions. For example, ketene ($CH_2=C=O$)

is an unstable material and has a decided tendency to polymerize to diketenes and dehydroacetic acid and to decompose under the influence of strong acid catalysts. Since the acetylation of difficultly enolizable compounds is a sluggish reaction, low yields are obtained with ketene. There is a further disadvantage in that ketene is a gas, difficult to handle, and must be prepared at the place where the acetylation is to be carried out.

I have now found that by reacting enolizable organic compounds with unsaturated monocarboxylic esters of the following general formula:

wherein R and $R_1$ each represents an alkyl, an aralkyl or an aryl group, in the presence of a complex acid catalyst, for example, an acyl sulfocarboxylic acid, unsaturated carboxylic esters are obtained at a much faster rate and in markedly increased yields with little, if any, objectionable by-products. Typical of such complex acid catalysts is acetyl sulfoacetic acid ($CH_3CO$—$O$—$SO_2$—$CH_2$—$COOH$)

which in addition to being a powerful acylation catalyst is also only mildly acidic and does not give a test for sulfate ion in water solution. This is especially valuable where enol acetylation produces an easily polymerized monomer.

The preferred complex acid catalysts of the invention can be represented by the general formula:

H—D—CO—O—$SO_2$—$D_1$—COOH wherein D and $D_1$ are divalent saturated aliphatic hydrocarbon groups (i. e. alkylene groups of the series $C_nH_{2n}$ wherein $n$ is a whole number not greater than 3) of the same number of carbon atoms selected from those containing from 1 to 3 carbon atoms such as, for example, acetyl sulfoacetic acid, propionyl sulfopropionic acid or butyryl sulfobutyric acid.

It is, accordingly, an object of the invention to provide an improved process, wherein the above-defined acid catalysts are employed, for preparing unsaturated carboxylic esters. Other objects will become apparent hereinafter.

In accordance with the invention, the unsaturated monocarboxylic ester is reacted with the enolizable organic compound, in the presence of the complex acid catalyst and at an elevated temperature, and the enol ester product then separated as by fractional distillation. Where the enolizable organic compound has a boiling point above that of the ketone by-product, the acetylation can conveniently be carried out in an ordinary distillation arrangement. As the acylation proceeds, the ketone is flashed off, thereby forcing the reaction to completion. This type of reaction is illustrated with isopropenyl acetate and crotonaldehyde which react to form 1-acetoxy butadiene-1,3 and acetone. The enolizable organic compound to be acylated may be diluted with an inert solvent such as diisopropyl ether, benzene, carbon tetrachloride, carbon disulfide, ethylene dichloride, etc., and the reaction conducted in this diluted medium. The temperature of the reaction can be varied from 60° to 130° C. The concentration of the catalyst can be varied from 0.05 to 3.0 per cent by weight of the reactants. Higher catalyst concentrations may be used, but no additional advantage would result. The reaction may be carried out at reduced, normal or increased pressures, either in batchwise or in continuous operations. The ratio of the unsaturated carboxylic ester acylating agent to the enolizable organic compound can be varied widely in the reaction, since any amount of the acylating agent will react to give a quantity of the product, but advantageously from 1 to 5 molecular proportions of the unsaturated monocarboxylic ester to each molecular proportion of the enolizable organic compound may be used. Polymerization inhibitors such as copper acetate, hydroquinone, etc., can be advantageously added to the reaction mixtures. Advantageously, the catalyst can be neutralized by addition to the reaction mixture, just prior to the product-separation step, of an appropriate amount of a neutralizing reagent such as sodium acetate, sodium bicarbonate, sodium hydroxide and the like.

Typical of the unsaturated monocarboxylic esters which I employ as acylating agents in practicing my invention are: isopropenyl acetate (2-acetoxy-propene-1), 2-acetoxy-butene-1,2-acetoxy-pentene-1, 2-acetoxyhexene-1, 2-acetoxyheptene-1, 2-(chloroacetoxy)-hexene-1, 2-benzoyloxyhexene-1, α-acetoxystyrene, 2-(phenylacetoxy)-propene-1, 2-acetoxy-3-phenylpropene-1, etc. Such unsaturated esters in which the acid radical is an acetate radical (i. e. acetoxy derivatives) can be prepared by condensing the appropriate ketone with ketene, in the presence of sulfuric acid. See Gwynn and Degering, Jour. Am. Chem. Soc. 64 2216 (1942). See also my copending application Serial No. 25,526, filed of even date herewith (now United States Patent 2,476,860, dated July 19, 1949). All the unsaturated monocarboxylic esters can be prepared by adding a monocarboxylic acid (e. g. acetic acid, propionic acid, butyric acid, benzoic acid, etc.) to the appropriate monosubstituted acetylene, in the presence of boron trifluoride. See Henion and Nieuwland, Journal of the Am. Chem. Soc. 56 1802 (1934).

Suitable enolizable organic compounds which may be employed in the process of the invention are aldehydes which contain at least two carbon atoms and which contain at least one hydrogen atom on the carbon atom adjacent the carbonyl group. The aldehydes containing at least two hydrogen atoms on the carbon atom adjacent the aldehyde group are especially useful in practicing the invention. Aldehydes which contain a system of conjugated bonds in which the double bond of the aldehyde group is a part such as, for example, crotonaldehyde, 2-ethacrolein and 2-ethyl-2-hexenal are also adaptable to the process of the invention. Acrolein and 2-methacrolein cannot be employed in my process. Polymeric forms of the aldehydes can be employed. Other enolizable organic compounds which may likewise be employed are ketones containing at least one hydrogen atom on a carbon atom adjacent the carbonyl group, diketones containing at least one hydrogen atom on a carbon atom adjacent a carbonyl group, and ketocarboxylic esters containing at least one hydrogen atom adjacent the keto carbonyl group. The ketones and diketones containing at least two hydrogen atoms on the carbon atom adjacent the carbonyl group, and the ketocarboxylic esters containing at least two hydrogen atoms on the carbon atom adjacent the keto carbonyl group are especially useful in practicing the invention.

Specifically, the enolizable organic compounds which may be employed in the practice of the invention include acetaldehyde, propionaldehyde, n-butyraldehyde, iso-butyraldehyde, n-valeraldehyde, iso-valeraldehyde, 2-ethylbutyraldehyde, phenylacetaldehyde, phenylpropaldehyde, crotonaldehyde, ketones such as methyl ethyl ketone, diethyl ketone, methyl isobutyl ketone, methyl amyl ketone, methyl hexyl ketone, diisobutyl ketone, methyl vinyl ketone, methyl isopropenyl ketone, cyclohexanone, cyclopentanone, cyclobutanone, acetophenone, mesityl oxide, methyl butyl ketone, phenyl propyl ketone, methyl benzyl ketone, methyl furfuryl ketone, difurfuryl ketone, ketocarboxylic esters such as ethyl pyruvate, ethyl propionylformate, ethyl n-butyrylformate, ethyl isovalerylformate, methyl acetoacetate, benzyl acetoacetate, methyl α-acetylpropionate, ethyl α-acetylpropionate, ethyl propionoacetate, methyl n-butyroacetate, phenyl acetoacetate, ethyl decanoylacetate, methyl levulinate, ethyl levulinate, ethyl-δ-(n-butyryl)-n-butyrate, diketones such as biacetyl (2,3-butanedione), acetylpropionyl, acetylisobutyryl, bipropionyl, bi-n-butyryl, acetylcaproyl, acetylacetone (2,4-pentanedione), 2,4-hexanedione, 2,4-heptanedione, 5-methyl-2,4-hexanedione, benzoylacetone, benzoylethyl methyl ketone, benzoyl-n-butyl methyl ketone, benzoyl-iso-butyl methyl ketone, 1-phenyl-2,4-pentanedione, 3-methyl-2,4-pentanedione, 2,5-hexanedione, 6-methyl-2,5-heptanedione, 3,6-octanedione, 4-benzoyl-2-butanone, 2,6-heptanedione, 1,3-cyclohexanedione, and the like.

The complex acid catalysts employed in the process of the invention may be prepared by the reaction of sulfuric acid on a carboxylic acid or its anhydride. For example, when sulfuric acid and acetic anhydride are mixed in proper proportions, there is obtained acetyl sulfoacetic acid which has the following structural formula:

$$CH_3CO-O-SO_2-CH_2-COOH$$

More specifically, this acid catalyst can be prepared in several ways (1) by reacting two gram-moles of acetic anhydride with one gram-mole of sulfuric acid (2) by reacting two gram-moles of acetic anhydride with one gram-mole of sulfur trioxide and (3) by reacting two gram-moles of ketene with one gram-mole of sulfuric acid. When an aliphatic acid is formed as a by-product, as in above methods (1) and (2), the aliphatic acid is preferably first removed by distillation before use of the catalyst. While more than two gram-moles of acetic anhydride or ketene can be employed for each gram-mole of sulfuric acid or sulfur trioxide, the preferred ratio is two gram-moles of acetic anhydride or ketene to one gram-mole of sulfuric acid or sulfur trioxide. The catalysts of the present invention are not to be confused with sulfoacetic acid

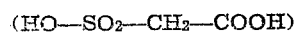
$$(HO-SO_2-CH_2-COOH)$$

or with sulfoacetic acid-acid addition products

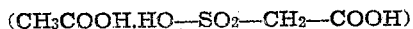
$$(CH_3COOH.HO-SO_2-CH_2-COOH)$$

which function principally as condensation catalysts. Prior art investigators have postulated the formation of these latter compounds in situ. Regardless of how these catalysts are prepared, whether in situ or independently, they do not compare favorably as to yield and as to freedom from objectionable polymeric by-products with the complex acid catalysts of the present invention. Acetyl sulfoacetic acid is particularly efficacious.

The following examples will serve to illustrate further the manner of practicing the invention.

Preparation of acetyl sulfoacetic acid

A quantity of acetyl sulfoacetic acid was prepared by reacting 40 cc. of concentrated sulfuric acid with 144 grams of acetic anhydride at 80° C. for a period of 30 minutes. The acetic acid which formed was removed by distillation at 50 mm. pressure. The residue in the flask was essentially pure acetyl sulfoacetic acid.

Example 1.—1-acetoxybutadiene-1,3

700 grams of crotonaldehyde, 1200 grams of isopropenyl acetate, 2 grams of acetyl sulfoacetic acid and 1 gram of copper acetate were mixed together in a distilling flask equipped with a short vigoreaux column and the mixture heated to gentle reflux. The excess isopropenyl acetate functioned as a diluent. 593 grams of acetone which formed in the reaction were removed over a period of 4 hours. The reaction mixture was then subjected to fractional distillation at reduced pressure. There was obtained a 96 per cent yield based on the crotonaldehyde of 1-acetoxy butadiene-1,3 boiling at 58° C. at 40 mm. pressure.

Example 2.—Alpha acetoxy styrene 2 gram-moles of acetophenone were heated with 2 gram-moles of isobutenyl acetate in a short still, in the presence of 0.5 gram of acetyl sulfoacetic acid. When 91 per cent of the theoretical quantity of methyl ethyl ketone, which formed in the reaction, had been removed by slowly distilling it off, the residue in the still was subjected to fractional distillation at reduced pressure. There was obtained an 87 per cent yield of alpha acetoxy styrene, boiling at 85° C. at 2 mm. pressure, based on the amount of isobutenyl acetate used.

Example 3.—2-acetoxy butadiene-1,3

A mixture of 200 grams of methyl vinyl ketone, 400 grams of isopropenyl acetate, 0.6 gram of acetyl sulfoacetic acid and 0.5 gram of copper acetate was heated to gentle reflux in a still. At the end of six hours, the theoretical quantity of acetone had been distilled off. Anhydrous sodium acetate was then added to the reaction mixture in sufficient quantity to neutralize the catalyst. The reaction mixture was then fractionally distilled. A yield of 275 grams of 2-acetoxy butadiene-1,3, boiling at 54° C. at 40 mm. pressure, was obtained. It had a refractive index (20/D) of 1.4421. This corresponds to a yield of 86 per cent based on the amount of methyl vinyl ketone used.

Example 4.—2-acetoxy-3-methyl butadiene-1,3

A mixture of 200 grams of methyl isopropenyl ketone, 400 grams of isopropenyl acetate, 0.6 gram of acetyl sulfoacetic acid and 0.5 gram of copper acetate was heated to gentle reflux in a still. At the end of six hours, the theoretical quantity of acetone had been distilled off. Anhydrous sodium acetate was then added in amount sufficient to neutralize the catalyst. The reaction mixture was then fractionated. A yield of 283 grams of 2-acetoxy-3-methyl butadiene-1,3, boiling at 62° C. at 40 mm. pressure, was obtained. It had a refractive index (20/D) of 1.4450. This corresponds to a yield of 95 per cent based on the amount of methyl isopropenyl ketone used.

Example 5.—Enol acetate of ethyl acetoacetate 260 grams of ethyl acetoacetate, 300 grams of isopropenyl acetate and 0.5 gram of propionyl sulfopropionic acid were mixed together and heated to gentle reflux in a still. The theoretical quantity of acetone which formed in the reaction was distilled off in a period of 30 minutes of heating. After this time, the residue in the flask was fractionally distilled at reduced pressure. A yield of 96 per cent of the theoretical, based on the amount of ethyl acetoacetate, of ethyl 2-acetoxy crotonate boiling at 10 mm. pressure was obtained.

In the same manner illustrated above, acetaldehyde and isopropenyl acetate give vinyl acetate, propionaldehyde and isobutenyl acetate give 1-acetoxy propene-1, n-butyraldehyde and isopropenyl acetate give n-butenyl acetate, phenylacetaldehyde and isopropenyl acetate give benzilidenemethyl acetate, diethyl ketone and isopropenyl acetate give 3-acetoxy pentene-2, cyclohexanone and isopropenyl acetate give cyclohexenyl acetate, acetyl acetone and isopropenyl acetate give 4-acetoxy-3-penten-2-one and 2,4-diacetoxy pentadiene-1,3, biacetyl and isopropenyl acetate give 2-acetoxy-1-buten-3-one and 2,3-diacetoxy 1,3-butadiene, ethyl pyruvate and isopropenyl acetate give ethyl α-acetoxyacrylate, etc.

Small amounts of water may be present in the reaction mixture without adversely affecting the process.

What I claim is:

1. A process for acylating enolizable organic compounds comprising heating, in the presence of an acid catalyst having the general formula:

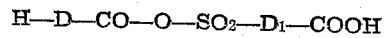

$$H-D-CO-O-SO_2-D_1-COOH$$

wherein D and $D_1$ represent divalent saturated aliphatic hydrocarbon groups of the same number of carbon atoms selected from the group consisting of a methylene group, an ethylene group and a propylene group, an unsaturated monocarboxylic ester selected from the group consisting of isopropenyl acetate, 2-acetoxy-butene-1, 2-acetoxy-pentene-1, 2-acetoxy-hexene-1, 2-acetoxy-heptene-1, with an enolizable organic compound selected from the group consisting of aldehydes containing at least two carbon atoms and containing at least one enolizable hydrogen atom on the carbon atom adjacent the carbonyl group, and aldehydes containing a carbon to carbon double bond conjugated with the double bond of the carbonyl group and containing at least one enolizable hydrogen atom on the carbon atom adjacent to one of the carbon atoms of the carbon to carbon double bond, ketones containing at least one hydrogen atom on a carbon atom adjacent to the carbonyl group and ketocarboxylic esters containing at least one hydrogen atom on the carbon atom adjacent the keto carbonyl group, and recovering the enol ester product which forms.

2. A process for acylating enolizable organic compounds comprising heating, in the presence of acetyl sulfoacetic acid, isopropenyl acetate with an aldehyde containing at least two carbon atoms and containing at least one hydrogen atom on the carbon atom adjacent the carbonyl group, and recovering the enol acetate of the aldehyde which forms.

3. A process for acylating crotonaldehyde comprising heating, in the presence of acetyl sulfoacetic acid, isopropenyl acetate with the crotonaldehyde, and recovering the 1-acetoxy butadiene-1,3 which forms.

4. A process for acylating enolizable organic compounds comprising heating, in the presence of acetyl sulfoacetic acid, isopropenyl acetate with a ketone which contains at least one hydrogen atom on a carbon atom adjacent the carbonyl group, and recovering the enol acetate of the ketone which forms.

5. A process for acylating methyl vinyl ketone comprising heating, in the presence of acetyl sulfoacetic acid, isopropenyl acetate with the methyl vinyl ketone, and recovering the 2-acetoxy butadiene-1,3 which forms.

6. A process for acylating enolizable organic compounds comprising heating, in the presence of propionyl sulfopropionic acid, isopropenyl acetate with a ketocarboxylic ester containing at least one hydrogen atom on the carbon atom adjacent the keto carbonyl group, and recovering the enol acetate of the ketocarboxylic ester which forms.

7. A process for acylating ethyl acetoacetate comprising heating, in the presence of propionyl sulfopropionic acid, isopropenyl acetate with the ethyl acetoacetate, and recovering the ethyl 2-acetoxy crotonate which forms.

HUGH J. HAGEMEYER, Jr.

No references cited.